United States Patent [19]

Bruinsma

[11] Patent Number: 5,086,194
[45] Date of Patent: Feb. 4, 1992

[54] TRUNKING ASSEMBLY

[75] Inventor: Robert F. W. Bruinsma, 9463 Ta-Eext-Nl, Netherlands

[73] Assignees: Electrak International Ltd., Surrey, England; BIS BV, Hoogezand, Netherlands

[21] Appl. No.: 503,774

[22] Filed: Apr. 3, 1990

[30] Foreign Application Priority Data

Apr. 7, 1989 [GB] United Kingdom ............. 8907896

[51] Int. Cl.⁵ .................................................. H05K 5/00
[52] U.S. Cl. .................................................. 174/48
[58] Field of Search .................. 174/48, 72 C, 101, 97, 174/68.3; 52/221; 439/120, 207, 209, 211

[56] References Cited

U.S. PATENT DOCUMENTS

| 2,384,487 | 9/1945 | O'Brien. | |
| 3,377,756 | 4/1968 | Polhamus | 174/48 X |
| 3,699,235 | 10/1972 | Wasson et al. | 174/48 |
| 3,814,833 | 6/1974 | Yamada et al. | 174/48 |
| 4,017,137 | 4/1977 | Parks | 174/48 X |
| 4,307,435 | 12/1981 | Ullman | 361/334 |

FOREIGN PATENT DOCUMENTS

| 0106535A | 4/1984 | European Pat. Off.. |
| 0272443 | 6/1988 | European Pat. Off.. |
| 289410 | 11/1988 | European Pat. Off.. |
| 3643559A1 | 6/1988 | Fed. Rep. of Germany. |
| 1017821 | 6/1961 | United Kingdom. |

OTHER PUBLICATIONS

Brochure entitled "Detail in Design" pub. 1986 by MITA (U.K.) Limited.

Primary Examiner—Leo P. Picard
Assistant Examiner—David A. Tone
Attorney, Agent, or Firm—Oliff & Berridge

[57] ABSTRACT

A trunking assembly for electrical cables comprises a channel section housing having a longitudinal opening defined by the inturned edges of its side walls. Mounting rails extend along the free edges of the inturned side walls within the channel section and a backing box for an electrical component such as a socket outlet is adapted to be fitted within the channel section and fixed to the mounting rails by a clamping ring. The assembly of the backing box and clamping ring is a snap fit within the housing and longitudinal adjustment of the assembly along the rails can be achieved prior to locking in position. When locked in position, the backing box and clamping ring improve the integrity of the housing by preventing significant deformation of the side walls.

15 Claims, 3 Drawing Sheets

TRUNKING ASSEMBLY

FIELD OF THE INVENTION

This invention relates to a trunking assembly of the kind comprising a housing defining a longitudinally extending conduit intended to carry electrical cables such as power supply, telephone and data cables.

In known trunking assemblies of this kind, the housing is generally formed in two parts, namely a longitudinally extending channel section and a removable front wall. Electrical fittings such as socket outlets which provide connection points to the cabling in the conduit are fitted either directly into the channel section, or in the removable front wall. In either case, electrical safety regulations in most countries dictate that the back of any fitting is enclosed by a backing box disposed within the conduit so as to prevent contact with exposed terminals during servicing.

When the trunking is assembled, the backing boxes are generally located in the housing by inserting them into the channel at approximately the desired position; they may be designed to clip into the housing and be adapted to slide longitudinally of the housing so that they can then be located in exactly the desired position. They are secured by fixing means such as screws which engage formations inside the housing. The socket outlets which are associated with the backing boxes are subsequently fitted over the front of the channel, usually by screws. Such an arrangement is described e.g. in EP-A 88400997.8 in which the backing boxes comprise U-shaped modular elements which can be clipped into formations extending from the base of the channel section.

DISCUSSION OF THE INVENTION

One characteristic of some trunking assemblies of this kind is that the walls of the housing are slightly elastically deformable, due to the shape of the channel section and/or the material from which it is made. This can result in the housing becoming deformed when the electrical fittings are secured in position, causing permitted tolerances of the parts to be exceeded and making the final appearance of the assembly unsightly. Where trunking is of a design in which the front wall is clipped into position between the walls of the channel section, this may result in the front wall being insecurely fixed.

The invention provides a trunking assembly which allows a backing box with or without an associated component to be clipped into position within the housing and moved freely into its desired location, and then secured by an arrangement which minimizes further elastic deformation of the housing. This ensures the integrity of the final assembly and provides more positive location for the various components.

The invention further provides a trunking assembly which incorporates a backing box designed to accept a wide range of electrical components including European, U.K. and U.S. types, thereby reducing the number of different fittings needed where the assembly is intended to meet the requirements of different markets.

According to the present invention, there is provided a trunking assembly for accommodating electrical wiring and accessories, comprising a housing having a base and side walls defining a longitudinally extending channel having an opening therein; a pair of mounting rails extending longitudinally within the channel; a backing box for an electrical accessory; and clamping means adapted to clamp the backing box to said mounting rails to fix it in position within the housing; wherein the mounting rails extend adjacent the opening so as to prevent excessive relative deformation of said walls on clamping of the backing box in position.

Preferably, the mounting rails extend adjacent the free edges of the side walls, and suitably the free edges of the side walls are inturned into the channel to define the edges of the opening therein, and the mounting rails are formed along the inturned free edges. In a preferred embodiment of the invention, the mounting rails comprise outwardly-turned edge regions of the inturned free edges of the side walls, and each side wall and its respective rail defines a slot facing outwardly towards the opening in the channel. Preferably, the clamping means comprise a pair of locating elements adapted to enter the slots, and the backing box is provided with abutment means adapted to engage behind the mounting rails.

Advantageously, the clamping means comprises a clamping ring having substantially the same shape in plan as the backing box, and screws connecting the clamping ring to said backing box.

In one preferred form of the invention, the abutment means comprise ramps adapted elastically to deform the side walls of the housing when the backing box is pushed into position within the channel, the ends of the ramps being adapted to pass beyond the mounting rails whereby the backing box is a sliding fit within the channel and is retained by abutment of said abutment means against the rear edges of the mounting rails; preferably the clamping ring is loosely connected to the backing box prior to insertion thereof into the channel whereupon the assembly may be slid to the desired position prior to clamping.

The invention thus provides an arrangement in which the walls of the trunking can flex to permit the insertion of the various components by a 'snap-in' action, subsequent clamping of the components into position then establishing the integrity of the assembly.

The backing box is suitably provided with fittings on one or both sides which are capable of interlocking with another backing box to provide a double or multiple backing box assembly. Spacer elements may be used between such multiple backing box arrangements to allow the assembly to accept larger electrical fittings which require corresponding spacing of the backing boxes.

The backing box may incorporate, prior to assembly of the trunking, an electrical fitting such as a socket outlet; in another arrangement the spacer ring may be integral with the fitting.

The assembly may incorporate a face plate for the backing box having lugs adapted to engage with the clamping ring. This enables it to be clipped in position over the backing box when the trunking is assembled. The face plate can be removed when a socket outlet is fitted or it may have an aperture for allowing communication with e.g. data or telephone cables in the conduit.

Cover plate means are preferably provided operable to close the opening in said channel adjacent said backing box, and said cover plate means is formed with side edges adapted frictionally to engage between side walls of said housing.

In order that the invention may be more fully understood, embodiments in accordance therewith will now

DESCRIPTION OF THE PREFERRED EMBODIMENTS

Figure 1:
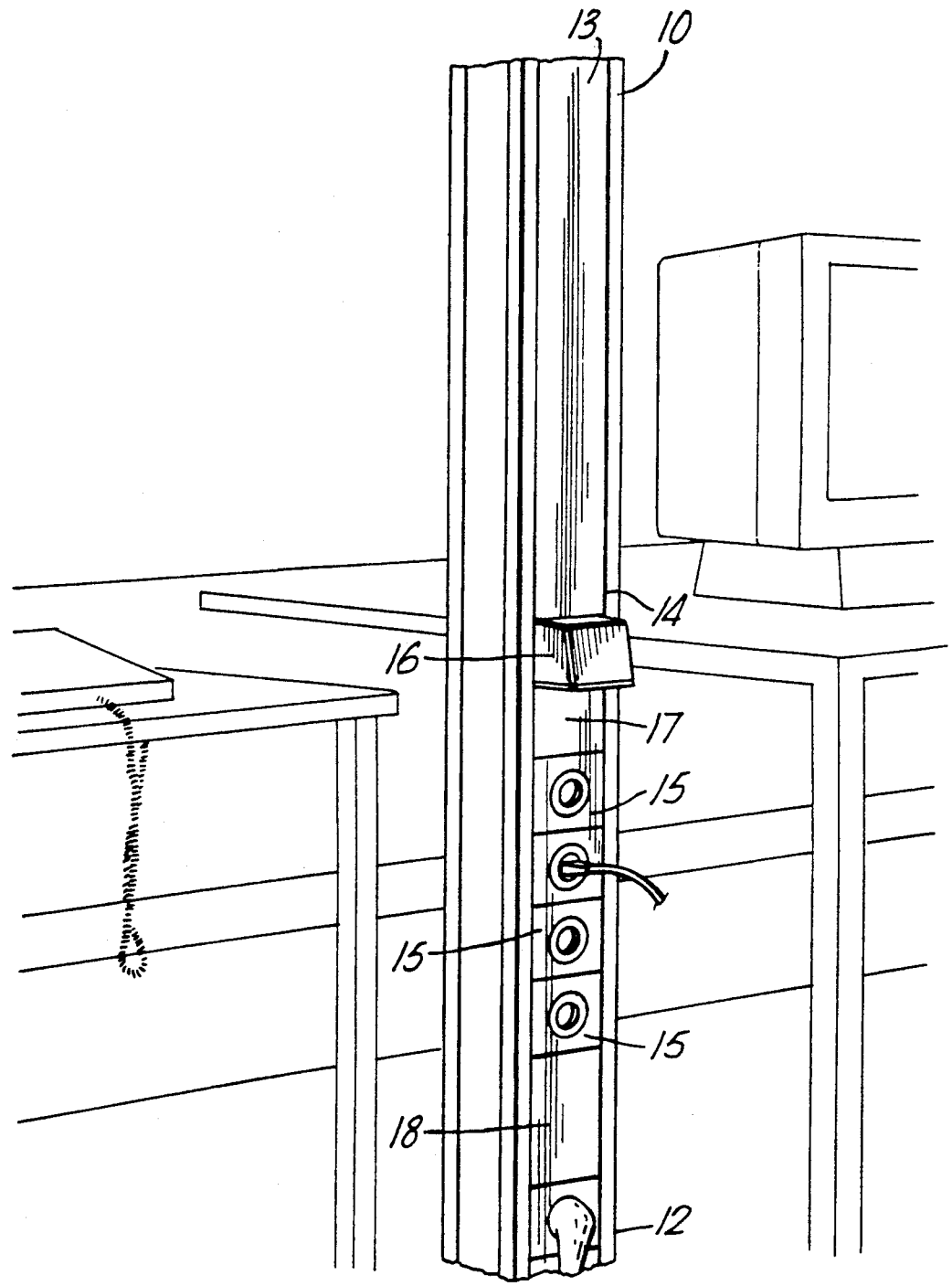
FIG. 1 is a perspective view of one form of completed trunking assembly.

Referring to the drawings, FIG. 1 shows a general view of a completed trunking assembly 10 in use. In the application illustrated, the assembly 10 is disposed in a vertical orientation to extend between the floor and ceiling of an office and thus to provide a convenient location for power distribution. The assembly 10 comprises a box-section housing 12 having a removable front wall 13 covering a continuous longitudinal opening 14. Sections of the front wall 13 are omitted to permit the fitting of various electrical components such as power sockets 15 and data connection boxes 16 which are disposed in the desired locations and which are connected to cables running within the trunking assembly 10. The spaces between the electrical fittings are closed by short sections of front wall in the form of cover plates 17, 18 which clip into position in the housing 12.

Figure 2:
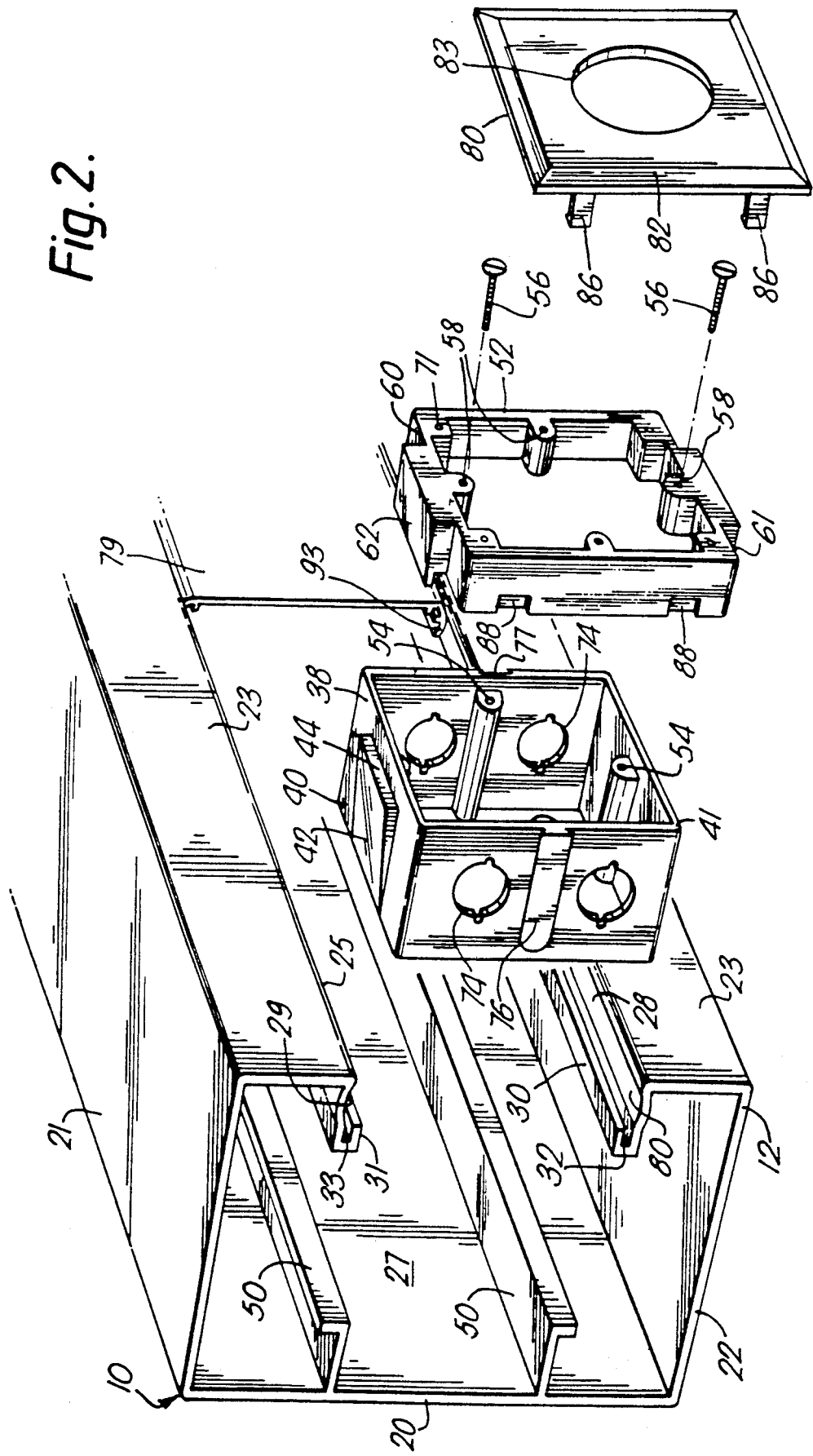
FIG. 2 is an exploded perspective view of the major components of another form of trunking assembly according to the invention.
Figure 3:
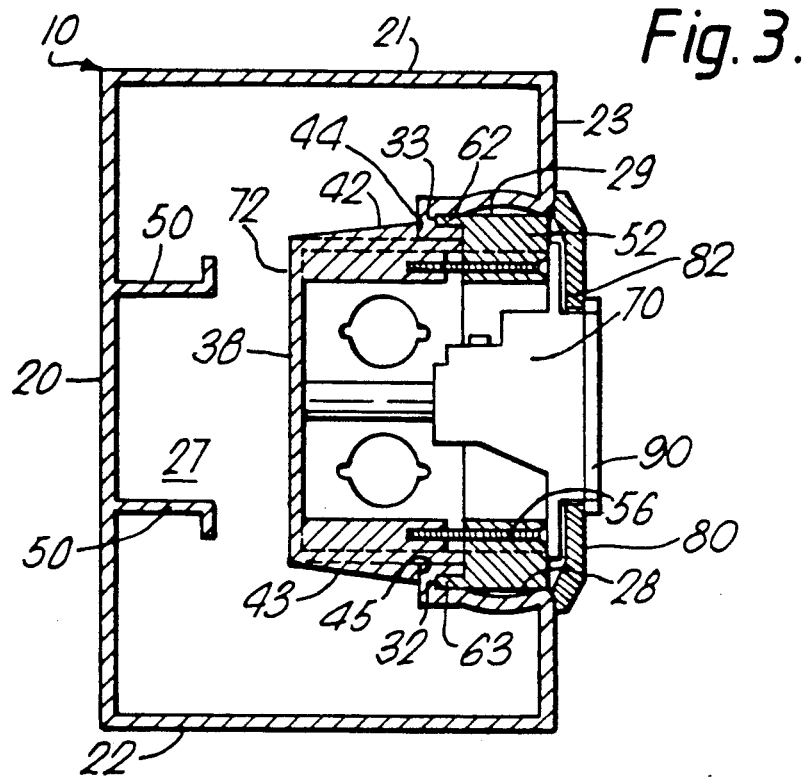
FIG. 3 is a vertical sectional view of the trunking of FIG. 2 when assembled, with an electrical component added.
Figure 4:
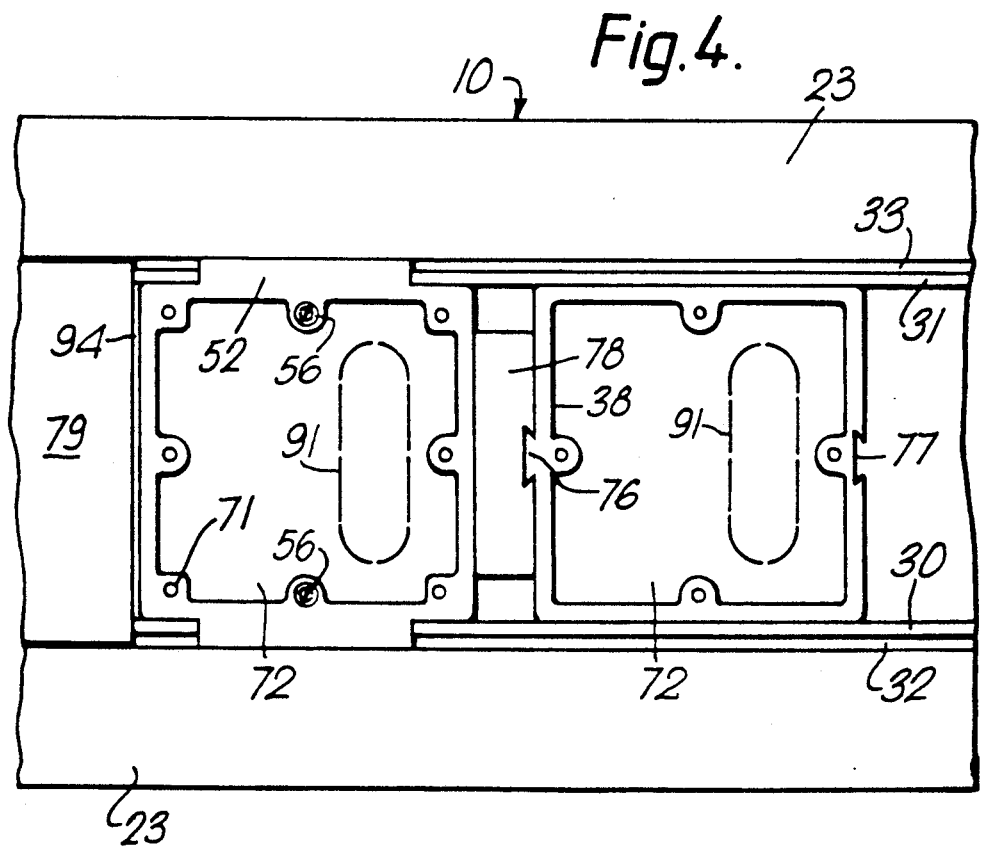
FIG. 4 is a front elevational view of a trunking assembly of the kind shown in FIG. 2 showing a pair of backing boxes in position therein but for reasons of clarity omitting the cover and the electrical component shown in FIG. 3.

The construction of a trunking assembly accordingly to the invention is shown in detail in FIGS. 2, 3 and 4. In this embodiment the trunking is intended to be disposed horizontally along the wall rather than vertically as shown in FIG. 1, although the constructional details are essentially the same.

Referring to FIG. 2, the assembly 10 comprises a housing 12 having a rear wall 20, side walls 21, 22 and upper and lower front wall sections 23. A longitudinally extending opening 25 is defined between the front wall sections 23, and the housing 12 defines a generally U-shaped channel 27 which is adapted to accommodate cabling such as power, data and telecommunication cables.

The side walls 28, 29 of the opening 25 are defined by inturned edges of the front wall sections 23, and the free edges of these walls 28, 29 are themselves turned outwardly to form a pair of mounting rails 30, 31 extending longitudinally of the opening. A pair of open slots 32, 33 are defined respectively between the mounting rails 30, 31 and the sides 28, 29.

It will be appreciated that the section of the housing 12 may vary considerably from that shown in the drawing depending on the application for which the trunking is intended; for example, the trunking assembly shown in FIG. 2 is intended to be secured to a wall surface in a horizontal mode, whereas if it was required to form a service pole of the kind shown in FIG. 1, the trunking would provide two or possibly even four channels 27 each with a continuous opening 25. The housing 12 may contain various formations within the channel 27 such as fixing rails and compartments intended to separate different cable networks within the trunking. For clarity these are mostly not shown in the drawings; the exception are flanges 50 which are located at DIN-standard dimensions and which are intended for mounting standardized electrical components.

The housing may be made from various materials but is preferably an extruded aluminium section. It may however be rolled or Pressed metal or moulded from plastics material In order to provide connections to the cabling within the conduit, it is necessary to mount socket outlets and other electrical accessories such as the items 15, 16 shown in FIG. 1 at intervals in the housing 12, and a backing box 38 is provided for enclosing the back of such an accessory, as required by electrical safety regulations. The backing box 38 comprises a rectangular moulding of fire-resistant plastics material such as polypropylene which is fitted into the housing 12 through the opening 25 in the front wall and which is dimensioned to fit snugly between flanges 30, 31 as shown in FIG. 3. Two opposite side walls 40, 41 of backing box 38 are provided with projections in the form of sloping ramps 42, 43 which terminate in abutment surfaces 44, 45. The overall width of the backing box including the ramps 42, 43 is slightly greater than the dimensions of the opening between rails 30, 31 but since the housing 12 has some capability of elastic deformation, the backing box 38 may be pushed into the opening, the ramps 42, 43 deforming the housing elastically until the abutment surfaces 44, 45 pass beyond the innermost edges of rails 30, 31. Once the backing box 38 has been pushed into Position in the housing between rails 30, 31, it is free to move within the housing, and may be slid along the length of the housing into exactly the desired position.

Backing box 38 is secured in position in the housing by means of a clamping ring 52. Clamping ring 52 is moulded from any suitable Plastics material such as ABS or nylon and is generally the same shape in plan as backing box 38. Backing box 38 is provided with threaded holes 54 for screws 56, and matching holes 58 are provided in clamping ring 52. The clamping ring 52 is provided on two opposite sides 60, 61 (which correspond to sides 40, 41 of backing box 38) with locking elements 62, 63 which are shaped to enter the slots 32, 33 formed in the edges of the opening 25. Locking of the backing box 38 in position is achieved by passing screws 56 through holes 58 in clamping ring 52, and engaging the screws in the corresponding holes 54 provided in backing box 38. Tightening of the screws causes the locking elements 62, 63 on clamping ring 52 to pass into the slots 32, 33, and to draw the abutment surfaces 44, 45 of backing box 38 up against the rear edges of rails 30, 31 as shown in FIG. 3. This clamps the backing box in position and at the same time locks the clamping ring to the front wall sections 23 of the housing, the location of the locking elements 62, 63 within slots 32, 33 preventing further elastic deformation of the housing at this point. This ensures the integrity of the assembly when the electrical fittings are subsequently added, and during actual use of the trunking assembly 10.

FIG. 3 shows diagramatically an electrical socket outlet 70 fitted in position within the backing box 38 and clamping ring 52. The socket outlet 70 is secured in position by means of screws (not shown) which enter holes 71 (FIG. 2) in clamping ring 52. Holes 58 may also be used to secure electrical accessories into the backing box, since only two screws 56 are needed to clamp the backing box 38 and clamping ring 52 together. In fact, although the mounting of the backing box has been described as a separate operation from securing and fixing the clamping ring, it is more convenient for the backing box 38 and locking ring 52 to be loosely assembled together before insertion of the complete assembly through the opening 25. The assembly is then simply moved to the correct position and the screws 56 tightened to lock the parts in position.

A face plate 80 is provided to close off the front of backing box 38 after the socket outlet 70 is secured in position. Face plate 80 has a front wall 82 which is provided with an opening 83 shaped to fit around the socket outlet. Extending from the rear face of the face plate are four lugs 86 (only two are shown) arranged in pairs on opposite sides of the assembly. These lugs are engageable with corresponding recesses 88 provided in the sides of clamping ring 52, and enable the face plate 80 to be clipped into position over the backing box. The face plate may be formed with various openings for different types of socket outlets, or it may be blank to cover an unused socket outlet or junction box contained within the backing box 38. In the latter case a safety cover may be secured to the backing box beneath the face plate. For more secure location of the face plate, screws may be used extending through the front wall 82 into holes 58 and 71 in the clamping ring 52. Alternatively, as shown in FIG. 3, a flange 90 on the socket 70 may retain the face plate in position.

Backing box 38 is provided with "knock-out" openings 74 for access to the cabling in the trunking, and further openings 91 may be provided in the back face 72 of the backing box if desired. Openings 74 may also serve for locating standard cable grips which may be required by electrical regulations in certain countries. The openings 91 may be used for accommodating data plugs and/or sockets.

FIG. 4 shows the assembly fitted with two adjoining backing boxes, with the socket outlet 70 and cover 80 omitted for clarity. The clamping ring is also omitted from the right-hand box, as will be described.

Each backing box 38 is formed with an interlocking connection 76 on one side thereof, together with a matching slot 77 on the other side. This enables two or more adjoining boxes to be connected together side by side, or if it is desirable to space the backing boxes (for example to accept electrical fittings which have larger face-plates) then a spacer block 78 provided with matching interlocking formations may be fitted between two adjacent backing boxes, as shown in FIG. 4. Where two backing boxes are connected together side-by-side, it may not be necessary to use more than one clamping ring 52, as shown in FIG. 4, since mounting will be adequate with a single clamping ring 52.

The opening 25 (FIG. 2) between the front wall sections 23 is closed after locking the backing box in position by a clip-in cover plate 79 (similar to cover plates 17, 18 of FIG. 1) which is cut to the desired length. Cover plate 79 is formed with curved edges 93 which engage shallow channels 80 provided in opposite side walls 28, 29 of the opening and abut forward edges of rails 30, 31. Frictional retention of cover plate 79 between walls 28, 29 is greatly assisted by the backing box and clamping ring assembly which prevents excessive deformation of the housing 12. As will be seen in FIG. 4, the cut edge of a cover plate 79 fits tightly up against the clamping ring 52 and any gap 94 is subsequently covered by the face-plate 82 of the electrical fitting 70 which is slightly larger than clamping ring 52.

It may be desirable to form the clamping ring as part of an electrical socket or other accessory, and in this case the clamping ring can be moulded with or otherwise secured to the electrical accessory, and used to lock the backing box in position in exactly the same manner. This allows the backing boxes and other electrical accessories to be provided as pre-assembled components which may be fitted quickly and conveniently into the housing. A backing box may itself contain a pre-wired fitting such as a socket outlet ready for mounting in position in the housing.

The distribution of the threaded holes in the clamping ring, and the fact that two or more backing boxes can be located side-by-side at different spacings, mean than many different types of electrical fittings can be accommodated. Where U.K. fittings are to be used, face plates 80 are dispensed with and the socket outlet is screwed directly into the clamping ring, the gaps between the cover plates 79 and the clamping ring being covered by the integral face plate which forms part of most U.K. electrical fittings.

What is claimed is:

1. A trunking assembly for accommodating electrical wiring and accessories, comprising a housing having a base and side walls defining a longitudinally extending channel having an opening therein; a pair of mounting rails extending longitudinally within the channel; a backing box freely longitudinally movable along said housing for accepting an electrical accessory; clamping means adapted to hook over said mounting rails; and fastening means for attaching said clamping means to said backing box with said mounting rails disposed therebetween so as to clamp the backing box to said mounting rails to longitudinally fix it in position within the housing; the said mounting rails extending adjacent to the opening whereby relative deformation of said walls is substantially prevented on clamping of the backing box in position.

2. A trunking assembly as claimed in claim 1, wherein the free edges of said side walls are inturned into the channel to define the edges of the opening therein, and said mounting rails are formed along said inturned free edges.

3. A trunking assembly as claimed in claim 2, wherein said mounting rails comprise outwardly-turned edge regions of the inturned free edges of said side walls, each said side wall and its respective rail defining therebetween a slot facing outwardly towards the opening in the channel.

4. A trunking assembly as claimed in claim 3, wherein said clamping means comprise a pair of locating elements adapted to enter said slots.

5. A trunking assembly as claimed in claim 1, wherein said backing box is provided with abutment means adapted to engage the rear edges of said mounting rails.

6. A trunking assembly as claimed in claim 5, wherein said clamping means comprises a clamping ring and screws connecting the clamping ring to said backing box.

7. A trunking assembly as claimed in claim 6, wherein said abutment means comprise ramps adapted elastically to deform the side walls of the housing when the backing box is pushed into position within the channel, the ends of the ramps being adapted to pass beyond the mounting rails whereby the backing box has a sliding fit within the channel being retained by abutment of said ramp ends against the rear edges of the mounting rails, and said clamping ring may be loosely connected to the backing box prior to insertion thereof into the channel, whereupon the assembly may be inserted into the channel and moved slidably to the desired position prior to locking in position therein.

8. A trunking assembly as claimed in claim 1, wherein cover plate means are provided operable to close the opening in said channel adjacent said backing box, and said cover plate means is formed with side edges adapted frictionally to engage between the side walls of said housing.

9. A trunking assembly for accommodating electrical wiring and accessories, comprising a housing having a base and side walls defining a longitudinally extending channel having an opening; a pair of mounting rails extending longitudinally within the channel, on opposite sides of the opening, each respective rail defining a slot facing outwardly towards the opening; a backing box for an electric accessory; and clamping means comprising respective locating elements adapted to enter said slots for mounting the backing box on said mounting rails; characterized in that there is provided abutment means adapted to engage rear edges of said mounting rails such that said backing box is fixed within said channel by clamping said mounting rails between said locating elements and said abutment means respectively whereby relative deformation of said housing walls is substantially prevented on clamping of the backing box in position.

10. A trunking assembly as claimed in claim 9, characterized in that the free edges of said side walls are turned in into the channel to define the edges of the opening therein, and said mounting rails are formed along said turned in free edges.

11. A trunking assembly as claimed in claim 10, characterized in that said mounting rails comprise outwardly-turned edge regions of the turned in free edges of said side walls, each said side wall and its respective rails defining therebetween said slot.

12. A trunking assembly as claimed in claim 9 characterized in that said abutment means are provided on said backing box.

13. A trunking assembly as claimed in claim 12, characterized in that said clamping means comprises a clamping ring and screws connecting the clamping ring to said backing box and said locating elements are formed on said clamping ring.

14. A trunking assembly as claimed in claim 13, characterized in that said abutment means comprise ramps adapted to engage and elastically deform the said walls of the housing, the ramps having ends adapted to pass beyond the mounting rails when the backing box is pushed into position within the channel, the backing box being a sliding fit within the channel, whereby said clamping ring may be loosely connected to the backing box prior to insertion thereof into the channel, forming an assembly, whereupon the assembly may be inserted into the channel and moved slidably to the desired position prior to locking in position therein.

15. A trunking assembly as claimed in claim 9, characterized in that cover plate means for closing the opening in said channel are provided adjacent said backing box, said cover plate means being formed with side edges adapted frictionally to engage between the side walls of said housing.

* * * * *